United States Patent
Mowry, Jr.

[11] Patent Number: 6,095,425
[45] Date of Patent: Aug. 1, 2000

[54] MACHINE-READABLE SECURITY DOCUMENT AND METHOD OF PREPARING THE SAME

[75] Inventor: William H. Mowry, Jr., Dayton, Ohio

[73] Assignee: The Standard Register Company, Dayton, Ohio

[21] Appl. No.: 09/179,069

[22] Filed: Oct. 26, 1998

[51] Int. Cl.[7] .................................................. B42D 15/00
[52] U.S. Cl. ........................ 235/494; 235/454; 235/491; 283/91; 283/93; 283/901; 283/902
[58] Field of Search .................................... 235/494, 454, 235/491; 283/72, 73, 74, 58, 57, 902, 901, 91, 93

[56] References Cited

U.S. PATENT DOCUMENTS

| | | | |
|---|---|---|---|
| 4,351,547 | 9/1982 | Brooks, II | 283/58 |
| 4,579,370 | 4/1986 | Corwin et al. | 283/72 |
| 5,021,318 | 6/1991 | Mayo et al. | 430/124 |
| 5,149,140 | 9/1992 | Mowry, Jr. et al. | 283/93 |
| 5,197,765 | 3/1993 | Mowry, Jr. et al. | 283/93 |
| 5,297,815 | 3/1994 | Anderson et al. | 283/93 |
| 5,340,159 | 8/1994 | Mowry, Jr. | 283/93 |
| 5,449,200 | 9/1995 | Andric et al. | 283/67 |
| 5,479,507 | 12/1995 | Anderson | 380/3 |
| 5,486,022 | 1/1996 | Crane | 283/83 |
| 5,487,567 | 1/1996 | Volpe | 283/72 |
| 5,735,547 | 4/1998 | Morelle et al. | 283/67 |
| 5,853,197 | 12/1998 | Mowry, Jr. et al. | 283/91 |

*Primary Examiner*—Michael G Lee
*Assistant Examiner*—Douglas X. Rodriguez
*Attorney, Agent, or Firm*—Killworth, Gottman, Hagan & Schaeff, LLP

[57] ABSTRACT

A security document and its method of preparation are provided wherein a security image area on the face of the document is designated. The security image area comprises a two-dimensional array of security image blocks. Security image elements and the complementary security image elements in respective security image blocks are arranged such that the security image element and the complementary security image element portions occupy respective first and second percentages of each of the security image blocks to define respective characteristic relative occupation values (CROVs) for each security image block. The respective CROVs are substantially equivalent among a plurality of the security image blocks. A target CROV is established. Respective security image element portions and respective complementary security image element portions are established such that the respective security image element portions occupy a first percentage of a selected security image block and the respective complementary security image element portions occupy a second percentage of the selected security image block. A relative value of the first and second occupation percentages is determined and compared with the target CROV. At least one of the complementary security image element portion and the security image element portion is adjusted, if the comparison indicates a significant disparity between the first and second occupation percentages and the target CROV, such that the relative value of the first and second occupation percentages substantially corresponds to the target CROV. Finally, a security document including the two-dimensional array of security image blocks is generated, wherein each of the security image blocks is occupied by the security image elements and the complementary security image elements.

17 Claims, 4 Drawing Sheets

MACHINE-READABLE SECURITY DOCUMENT AND METHOD OF PREPARING THE SAME

BACKGROUND OF THE INVENTION

The present invention relates to security documents including a security image composed of individual security image elements and complementary security image elements. When an attempt is made to duplicate or reproduce a document on which the security image is present, at least some of the security image elements change their appearance on the intended duplicate document, or are altered with respect to some other physical characteristic on the intended duplicate or reproduced document. The change in appearance, or the altered physical characteristic, of the elements is utilized to provide an indication that an attempt has been made to duplicate the document.

For example, the security image elements and the complementary security image elements may be designed such that, upon the attempted duplication, e.g., by photocopying, either the security image elements or the complementary security image elements are altered while the others remain substantially the same. The elements are arranged such that the attempted duplication results in the formation of a readily apparent warning image on the face of the document. Specifically, when an attempt is made to copy the document, the word "VOID" may appear on the duplicate document. Further, the security image elements and the complementary security image elements are arranged such that the presence of the security image and the security image elements is not readily apparent on the original. Examples of security documents of this type are illustrated in U.S. Pat. Nos. 4,579,370, 5,149,140, 5,197,765, 5,340,159, the disclosures of which are incorporated herein by reference.

Accordingly, the above-described prior art provides a means by which a person charged with the responsibility of reviewing security documents can identify documents that are unauthorized copies of the original security document. However, the above-described conventional security documents are not specifically designed so as to be reliably verifiable by an electronic document reader, e.g., an optical imaging device. Accordingly, there is a need for a security document, a method of preparing a security document, and a security document processing system wherein the security document is specially designed to provide a reliable indication of authenticity to an electronic authentication device without compromising the document's ability to provide a human-recognizable indication of authenticity.

BRIEF SUMMARY OF THE INVENTION

This need is met by the present invention wherein a security document includes security image elements and complementary security image elements arranged such that they perform the dual function of providing a reliable human recognizable and machine readable indication of authenticity. The above reference to one type of conventional security document is not intended to limit the scope or application of the present invention to a specific type of security document. Rather, for the purposes of defining and describing the present invention, it should be understood that security image elements and complementary security image elements according to the present invention are any printed elements that function to provide an indication that an attempt has been made to duplicate or reproduce an original security document. The attempted duplication or reproduction could be through conventional or state of the art photocopying methods (analog, digital, color, black-and-white, etc.), printing methods (ink jet, laser, etc.), publishing methods, etc.

In accordance with one embodiment of the present invention, a method of preparing a security document is provided wherein a security image area on the face of the document is designated. The security image area comprises a two-dimensional array of security image blocks and each of the security image blocks is occupied by a set of security image elements and a set of complementary security image elements. The security image elements occupy a security image element portion of each of the security image blocks and the complementary security image elements occupy a complementary security image element portion of each of the security image blocks. The security image elements and the complementary security image elements in respective security image blocks are arranged such that the security image element portion and the complementary security image element portion occupy respective first and second percentages of each of the security image blocks to define respective characteristic relative occupation values for each security image block. The respective characteristic relative occupation values are substantially equivalent among a plurality of the security image blocks. A target characteristic relative occupation value is established. Respective security image element portions and respective complementary security image element portions are established such that the respective security image element portions occupy a first percentage of a selected security image block and the respective complementary security image element portions occupy a second percentage of the selected security image block. A relative value of the first and second occupation percentages is determined and compared with the target characteristic relative occupation value. At least one of the complementary security image element portion and the security image element portion is adjusted, if the comparison indicates a significant disparity between the first and second occupation percentages and the target characteristic relative occupation value, such that the relative value of the first and second occupation percentages substantially corresponds to the target characteristic relative occupation value. Finally, a security document including the two-dimensional array of security image blocks is generated. Each of the security image blocks is occupied by the security image elements and the complementary security image elements.

The step of adjusting at least one of the complementary security image element portion and the security image element portion may comprise changing a stroke width of the security image element portion or changing the dimensions of respective security image blocks. The security image element portion preferably comprises the security image elements and non-printed portions separating the security image elements. Similarly, the complementary security image element portion preferably comprises the complementary security image elements and non-printed portions separating the complementary security image elements. The security image elements may be any conventional geometrical shape suitable for the construction of a security image, selected from a group consisting of circles, lines, dots, squares, ovals, triangles, and clusters thereof, in various combinations. Other shapes, such as stars letters, words, and logos may also be utilized.

The security image area may include a camouflage image superimposed over the security image element portion and the complementary security image element portion, wherein the camouflage image comprises camouflage image elements selected from a group consisting of printed elements and non-printed elements. The relative value of the first and second occupation percentages may be determined through a mathematical comparison selected from a group consisting of a ratio, a product, a difference, a sum, and combinations thereof. The relative value of the first and second occupation percentages may be compared with the target characteristic relative occupation value through a mathematical comparison selected from a group consisting of a ratio, a product, a difference, a sum, and combinations thereof.

In accordance with another embodiment of the present invention, a method of preparing a security document is provided wherein the designated security image area comprises a two-dimensional array of security image blocks and each of the security image blocks defines an image block pixel array. Respective security image element portions and complementary security image element portions are established such that they occupy first and second pixel portions of a selected security image block pixel array. An indication of the number of pixels in the first pixel portion relative to the number of pixels in the second pixel portion is generated and compared with the target characteristic relative occupation value. At least one of the complementary security image element portion and the security image element portion are adjusted, if the comparison indicates a significant disparity between the relative pixel number indication and the target characteristic relative occupation value, such that the relative pixel number indication substantially corresponds to the target characteristic relative occupation value.

In accordance with yet another embodiment of the present invention, a method of preparing a security document is provided, wherein at least one of the plurality of security image blocks defines a first security image and at least one of the plurality of security image blocks defines a second security image such that the first security image is dimensionally distinct from the second security image. The respective characteristic relative occupation values of the first security image and the second security image are substantially equivalent. A target characteristic relative occupation value is established for the first security image and the second security image. Respective security image element portions and complementary security image element portions are established within the first security image and the second security image such that they occupy first and second percentages of each of the first and second security image blocks. A relative value of the first and second occupation percentages is determined and compared with the target characteristic relative occupation value. At least one of the complementary security image element portion and the security image element portion is adjusted, if the comparison indicates a significant disparity between the first and second occupation percentages and the target characteristic relative occupation value, such that the relative value of the first and second occupation percentages substantially corresponds to the target characteristic relative occupation value.

In accordance with yet another embodiment of the present invention, a security document is provided comprising a document face and a security image area defined on the document face. At least one of the plurality of security image blocks defines a first security image and at least one of the plurality of security image blocks defines a second security image such that the first security image is dimensionally distinct from the second security image. The respective characteristic relative occupation values of the first security image and the second security image are substantially equivalent. The tone of the security image elements and the tone of the complementary security image elements may vary together across the security image area. The security image area may include a camouflage image superimposed over the security image element portion and the complementary security image element portion.

In accordance with yet another embodiment of the present invention, a security document is provided comprising a document face and a security image area on the document face. At least one of the plurality of security image blocks defines a first security image and at least one of the plurality of security image blocks defines a second security image such that the first security image is visually distinct from the second security image. The respective characteristic relative occupation values of the first security image and the second security image are substantially equivalent. The first security image and the second security image may occupy image blocks of substantially the same or different sizes. Adjacent image blocks of the array of security image blocks may share at least one mutual boundary and respective security image element portions of the adjacent image blocks may touch the mutual boundary. Further, each of the security image blocks may be defined by an image block boundary having multiple sides and respective security image element portions of each of the security image blocks may touch each of the multiple sides of the image block boundary.

In accordance with yet another embodiment of the present invention, a security document processing system is provided comprising a document issuing station and at least one document receiving station. The document receiving station includes a security document reader arranged to read the respective characteristic relative occupation values of the security document.

Accordingly, it is an object of the present invention to provide a security document including security image elements and complementary security image elements arranged such that they perform the dual function of providing a reliable human recognizable and machine readable indication of authenticity. Other objects of the present invention will be apparent in light of the description of the invention embodied herein.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which.

DETAILED DESCRIPTION OF THE PREFERRED EMBODIMENTS

For the purposes of describing and defining the present invention, it should be understood that a security document is a document including a feature or characteristic designed or arranged to prevent successful unauthorized duplication or reproduction of the document, typically by providing an indication of such on the duplicate or reproduced document itself. The indication of an attempted duplication or reproduction may be such that it is apparent to the naked eye or such that it is apparent through the use of an optical scanner, special viewing optics, special detection hardware, etc. Further, the indication may be such that it is apparent through more than one of these means. For example, when an attempt is made to duplicate a document with a photocopier, the word "VOID" may appear on the duplicate document, as viewed by the naked eye. Further, some of the image elements may be altered on the duplicate document such that the alteration is apparent with the aid of special scanning, viewing, or detection hardware.

Figure 1:
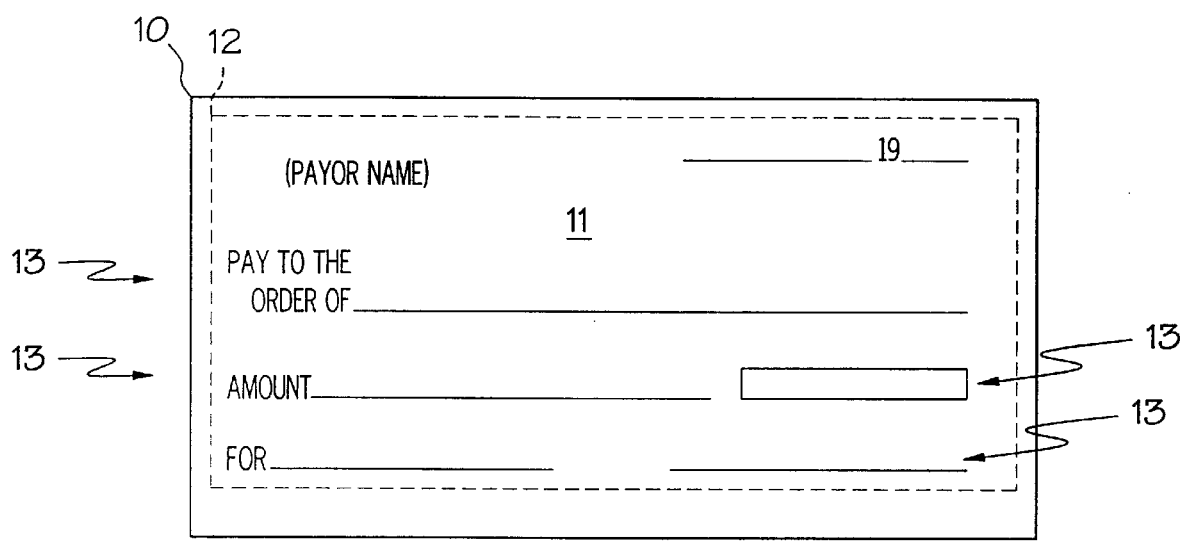
FIG. 1 is a schematic illustration of a security document according to the present invention.

The security document of the present invention, and its method of preparation are illustrated in detail herein with reference to FIGS. 1–7, where like structure is indicated with like reference numerals. A security document 10 according to the present invention is prepared by designating a security image area 12 on the face 11 of the document 10, see FIG. 7, step 100. FIG. 1 illustrates the typical positioning of the security image area 12 on the face of the security document. It is contemplated by the present invention, however, that the security image area 12 can be arranged to occupy the entire face 11 of the document 10 or merely a specific portion of the face 11 of the document 10. Preferably, the security image area 12 occupies at least the portions of the face 11 dedicated to security data 13, e.g., payor, payee, amount, authorized signature, etc.

Figure 2:
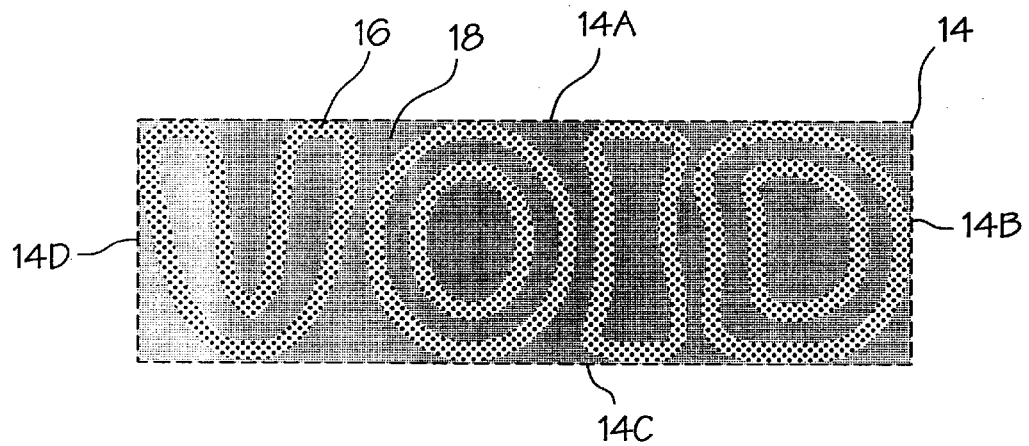
FIG. 2 is a schematic illustration of a security image block according to the present invention.
Figure 5:
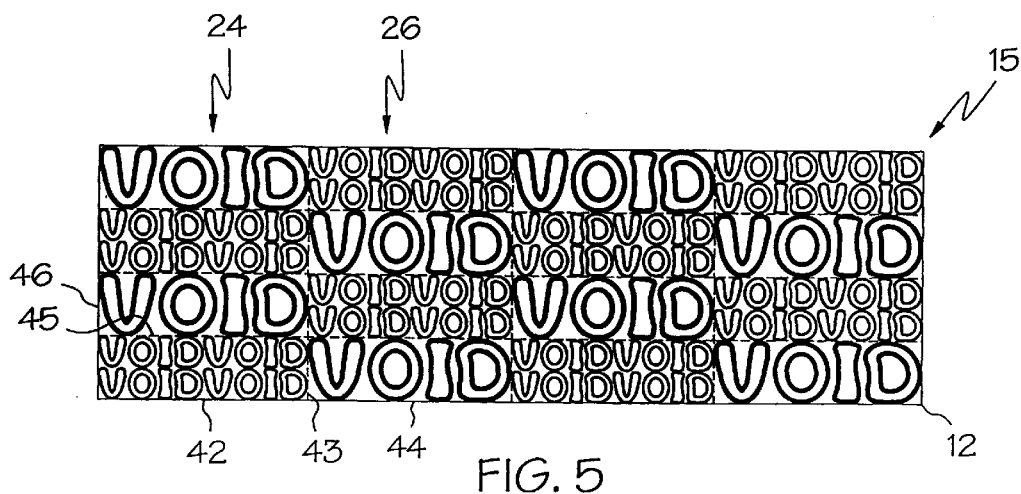
FIGS. 5 and 6 are schematic illustrations of alternative security image areas according to the present invention.
Figure 6:
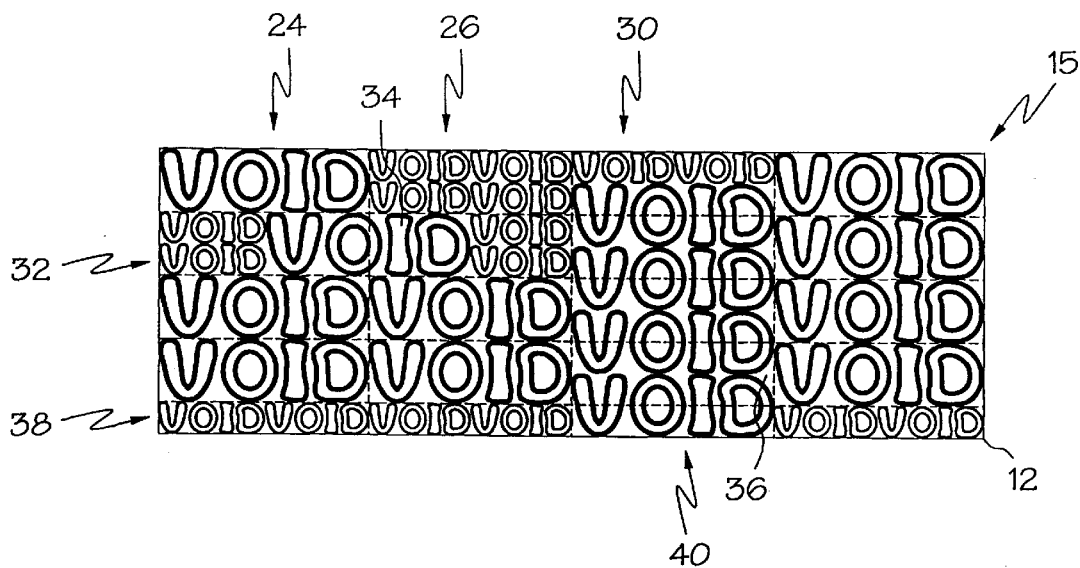

The security image area 12 comprises a two-dimensional array of component security image blocks 14 that collectively form an overall security image 15, see FIGS. 2, 5, and 6. A single security image block 14 is illustrated schematically in FIG. 2. FIGS. 5 and 6 illustrate schematically two arrangements of security image blocks 14 within the security image area 12. It is contemplated by the present invention that, although the security document 10 illustrated in the figures of the present invention is presented in the form of a substantially uniform tint "VOID" pantograph, the present application is also applicable to varying tone or graduated screen security documents and other types of security documents.

In FIGS. 2, 5, and 6, the boundaries of the security image blocks 14 are indicated with dashed lines which are typically not printed on the face 11 of the document 10. Each of the security image blocks 14 is occupied by a set of security image elements 16 and a set of complementary security image elements 18. In FIG. 2, the security image elements 16 form the individual letters of the word "VOID" while the complementary security image elements 18 form the background of the word. As will be appreciated by those practicing the present invention, the size of the security image elements 16 in the illustrated embodiment is selected such that they are readily reproduced by a photocopier while the size of the complementary security image elements 18 is selected such that, upon photocopying, the background image is significantly degraded and the letters of the word "VOID" become readily apparent to a casual observer. As will be further appreciated by those practicing the present invention, the actual sizes, spacing, and shape of the security image elements 16 and the complementary security image elements 18 are not illustrated in FIG. 2. Rather, the actual sizes, spacing, and shapes of the image elements 16, 18 is left to the selection of the particular artisan made in light of the teachings set forth herein and of the teachings of the prior art cited above and incorporated herein by reference. According to one embodiment of the present invention the security image elements 16 comprise relatively small dots spaced at frequency of 130 dots per inch and the complementary security image elements 18 comprise relatively large dots spaced at a frequency of 65 dots per inch. The specific sizes of the dots are selected to create an overall even document tone.

Figure 3:
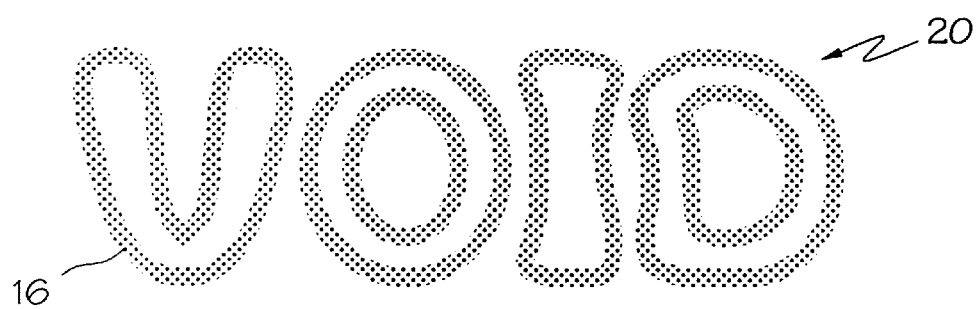
FIGS. 3 and 4 are schematic illustrations of a security image element portion and a complementary security image element portion of the present invention, respectively.

For the purposes of describing and defining the present invention, the security image elements 16 are said to occupy a security image element portion 20 of each of the security image blocks 14, see FIGS. 2 and 3. Similarly, the complementary security image elements 18 occupy a complementary security image element portion 22 of each of the security image blocks 14, see FIGS. 2 and 4. The security image elements 16 and the complementary security image elements 18 in respective security image blocks 14 are arranged such that the security image element portion 20 and the complementary security image element portion 22 occupy respective first and second percentages of each of the security image blocks 14 to define respective characteristic relative occupation values (CROVs) for each security image block 14. The respective CROVs are substantially constant among the security image blocks 14. It is contemplated by the present invention that the CROVs of all of the security image blocks 14 may not need to be precisely controlled for some applications of the present invention. As will be appreciated by those practicing the present invention, the shape and stroke width of the particular characters defining the security image element portion 20 and the complementary security image element portion 22 of each of the security image blocks 14 is subject to alteration according to the particular preferences and needs of those practicing the present invention.

The security image elements 16 and the complementary security image elements 18 define together the CROV for each security image block 14. Specifically, where the security image elements 16 occupy a first percentage of the security image block 14 (the security image element portion 20), and where the complementary security image elements 18 occupy a second percentage of the security image block 14 (the complementary security image element portion 22), a relative value of the first and second occupation percentages may be calculated to determine the CROV of the security image block 14. The CROV may be a ratio, a difference, product, sum, or any other quantitative mathematical comparison of (i) the security image element portion 20 and the complementary security image element portion 22, (ii) the security image element portion 20 and the security image block 14, or (iii) the complementary security image element portion 22 and the security image block 14.

According to one aspect of the present invention, the security document 10 is prepared by constructing each security image block 14 from a plurality of individual pixels arranged in an ordered array such that each image block 14 defines an image block pixel array. Where each image block 14 defines an image block pixel array, each security image element portion 20 may be said to occupy a first pixel portion of a selected security image block pixel array, as opposed to a first percentage of a selected security image block 14. Similarly, each complementary security image element portion 22 may be said to occupy a second pixel portion of the selected security image block pixel array, as opposed to a second percentage of a selected security image block 14. Further, an indication of the number of pixels in the first pixel portion relative to the number of pixels in the second pixel portion may be generated as an alternative to determining the relative value of the first and second occupation percentages, as described above. Adobe® Photoshop®, available from Adobe Systems Incorporated, San Jose, Calif., is an example of a graphics software package that allows a designer to conveniently divide an image area or block into pixels and separate the pixels into a first group of pixels representing non-printed matter and a second group of pixels representing printed matter.

Figure 4:
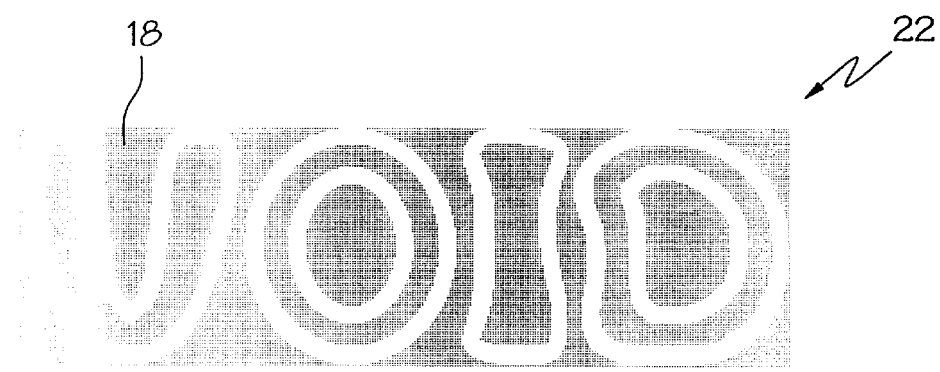
Figure 7:
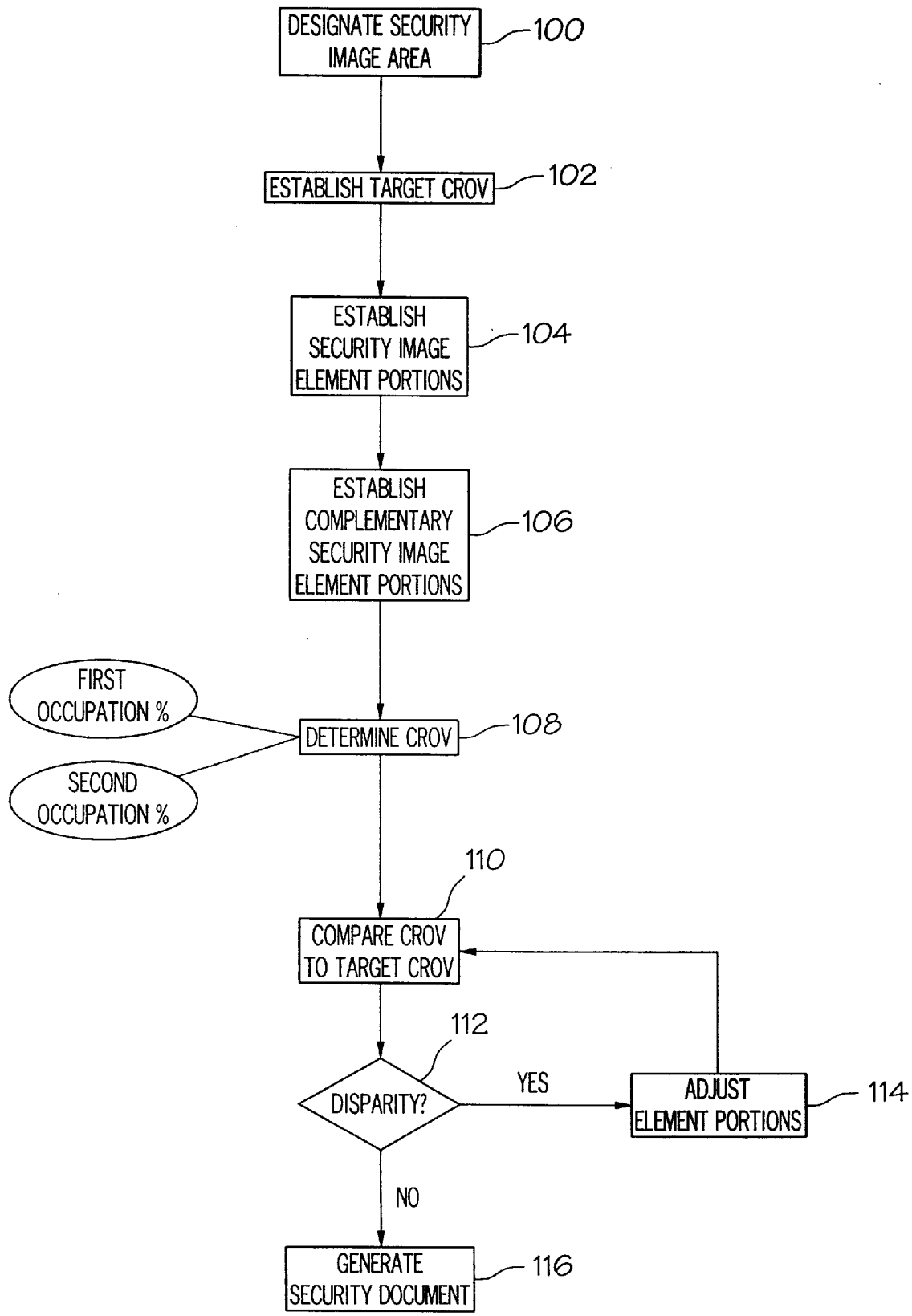
FIG. 7 is a flow chart illustrating a method of preparing a security document according to the present invention.

Just as the security image area 12 must be designated to prepare the security document 10 of the present invention, a target characteristic relative occupation value (target CROV) must also be established, see FIG. 7, step 102. Typically, the target CROV is established or selected to meet the requirements of the particular electronic authentication device to be used to validate the security document 10 because the security document 10 is preferably designed to allow electronic authentication or validation by an electronic imaging device programmed to recognize the CROV of one or more security image blocks 14 within the security document 10. FIGS. 2–4 illustrate a target CROV according to one embodiment of the present invention, where a significant portion of the security image block 14 is occupied by the security image element portion 20.

The security image element portions 20 are established, i.e., the size and shape of the security image element portions 20 are selected, such that they occupy a first percentage of respective security image blocks 14, see FIG. 7, step 104. Similarly, the complementary security image element portions 22 are established such that they occupy a second percentage of respective security image blocks 14, see FIG. 7, step 106. In this manner, a first percentage of each security image block 14 will be occupied by a security image element portion 20 comprised of security image elements 16 and a second percentage of each security image block 14 will be occupied by a complementary security image element portion 22 comprised of complementary security image elements 18. As will be appreciated by those practicing the present invention, these occupation percentages can correspond to any one of a number of specific mathematical quantities. The description of the present invention embodied herein primarily refers to the percentage of the area of the security image area 12 occupied by the general boundaries of the letters forming the "VOID" image, as is illustrated in FIGS. 2 and 3. In FIGS. 2 and 3, the security image element portion 20 comprises the security image elements 16 and the non-printed portions separating the security image elements 16. The complementary security image element portion 22 comprises the complementary security image elements 18 and the non-printed portions separating the complementary security image elements 18. It is contemplated by the present invention, however, that the occupation percentages could be the respective sums of the discrete areas occupied by the individual security image elements 16 and complementary security image elements 18 within the security image area 12. It is also contemplated by the present invention that the security image elements 16 may be selected from a group consisting of circles, lines, squares, ovals, triangles, dots, and clusters thereof, in various combinations. Other shapes, such as stars letters, words, and logos may also be utilized.

Next, the relative values of the first and second occupation percentages, i.e., the respective CROVs, are determined and compared to the target CROV, see FIG. 7, steps 108 and 110. Where this comparison indicates a significant disparity between the first and second occupation percentages, i.e., the respective CROVs, and the target CROV, either or both of the complementary security image element portion 22 and the security image element portion 20 are adjusted to substantially eliminate the disparity, see FIG. 7 steps 112 and 114. The adjustment may be accomplished by, inter alia, changing the stroke width of the security image element portion 20, the dimensions of the respective security image blocks 14, or the overall dimensions of the security image element portions 20 relative to the security image block 14.

For example, if the target CROV is established at 0.4, indicating that 40% of the security image area is to be occupied by the security image element portion 20, and if the relative values of the first and second occupations percentages in each security image block 14 indicate that merely 30% of each security image block 14 is occupied by the security image element portion 20, then the respective areas occupied by the security image elements 16 and the complementary security image elements 18 are altered such that the relative value of the first and second occupation percentages substantially corresponds to the target CROV. If the relative value of the occupation percentages is a ratio and the target relative occupation value is also a ratio, the relative value of the first and second occupation percentages may be said to substantially correspond to the target CROV when the two values are equal, within an acceptable margin of error. The acceptable margin of error depends largely upon the operational preferences of those practicing the present invention. It is contemplated by the present invention that the relative value of the first and second occupation percentages may be compared with the target CROV through a mathematical comparison selected from a group consisting of a ratio, a product, a difference, a sum, and combinations thereof.

To complete the procedure, the security document 10 is generated. That is to say, the security document 10 is printed on a laser printer or another printer suited for the production of security documents including security image elements 16 and complementary security image elements 18, see FIG. 7, step 116. Preferably, the security image area 12 also includes a camouflage image superimposed over the security image element portion 20 and the complementary security image element portion 22. As will be appreciated by those practicing the present invention, particularly in light of the teachings of the prior art, the camouflage image may comprise printed or non-printed image elements and should be distributed over the surface of the document so as not to alter the respective CROVs of each security image block 14. Further, the tone of the security image elements 16, the complementary security image elements 18, and the camouflage image may vary together across the security image area 12, as taught in U.S. Pat. No. 5,340,159.

The security image block arrangements of FIGS. 5 and 6 include a plurality of security image blocks 14. A first set of security image blocks 14 defines respective first component security images 24, a second set of the security image blocks 14 defines respective second component security images 26, and additional sets of security image blocks define additional component security images 30, 32, 34, 36, 38, 40. As is clearly illustrated in FIGS. 5 and 6, the first component security image 24 is dimensionally and visually distinct from the second component security image 26 and each additional component security image 30, 32, 34, 36, 38, 40. Specifically, the first component security image 24 comprises a relatively large single "VOID", the second component security image 26 comprises four relatively small "VOIDs", and the additional component security images 30, 32, 34, 36, 38, 40 comprise combinations or selected portions of the first and/or second component security images 24, 26. For the purposes of describing and defining the present invention, it is noted that dimensionally distinct images are images that define different physical dimensions relative to each other, and that visually distinct images are images that define different visual appearances relative to each other.

In FIG. 5, the first component security image 24 and the second component security image 26 occupy image blocks of substantially the same size and contain either one or four complete images of the "VOID" term. In contrast, referring to FIG. 6, although the first component security image 24, the second component security image 26, and the additional component security images 30, 32, 34, and 36 occupy image blocks of substantially the same size, the additional component security images 38 and 40 occupy image blocks of a different size than the first and second component security images 24, 26. Further, the additional component security images 30, 32, 34, 36, 38, and 40 contain partial versions of the "VOID" term. Despite these significant differences between the component security images, the respective CROVs of each component security image, including the first component security image 24, the second component security image 26, and the additional component security images 30, 32, 34, 36, 38, 40, are substantially equivalent. In this manner, an electronic device set to read the CROV of a portion of a security document according to the present invention, and including a variety of component security images, will generate substantially the same detected CROV regardless of what portion of the security document is read, scanned, or imaged by the electronic device, as long as the portion read, scanned, or imaged is a significant size. Preferably, the portion read, scanned, or imaged is equivalent to the size of at least one block.

To further improve reliability in electronic validation, it is preferable to ensure that each component security image 24, 26, 30, 32, 34, 36, 38, and 40 substantially or completely fills its security image block 14. For example, referring to FIG. 5, since all adjacent image blocks 14 share at least one mutual boundary, e.g., dashed line 43 between adjacent blocks 42 and 44, it is preferable to establish respective security image element portions 20 of the adjacent image blocks 14 such that the respective security image element portions 20 of the adjacent image blocks touch the mutual boundary. Stated more specifically, the adjacent image blocks 14 of the array of security image blocks share a plurality of mutual boundaries, e.g., dashed lines 43 and 45 between adjacent blocks 42, 44, and 46, and respective security image element portions 20 of the adjacent image blocks touch the mutual boundaries. Referring now to FIG. 2, each of the security image blocks 14 are defined by an image block boundary having multiple sides 14A, 14B, 14C, 14D, and respective security image element portions 20 of each of the security image blocks 14 touch each of the multiple sides 14A, 14B, 14C, 14D of the image block boundary.

In a particular embodiment of the present invention, the means provided for enabling electronic validation of the security document 10 is a scanner that is also capable of reading and storing transactional data printed or encoded on the face of the document 10. Typically, once the document 10 is validated, the transactional data is separated from the data used to enable electronic validation of the document 10 and placed into a long term data memory for further processing. The data used to enable electronic validation may be discarded after completion of the final validation step. Having described the invention in detail and by reference to preferred embodiments thereof, it will be apparent that modifications and variations are possible without departing from the scope of the invention defined in the appended claims.

What is claimed is:

1. A method of preparing a security document comprising the steps of:

designating a security image area on the face of a document, wherein
    said security image area comprises a two-dimensional array of security image blocks,
    each of said security image blocks is occupied by a set of security image elements and a set of complementary security image elements,
    said security image elements occupy a security image element portion of each of said security image blocks,
    said complementary security image elements occupy a complementary security image element portion of each of said security image blocks,
    said security image elements and said complementary security image elements in respective security image blocks are arranged such that said security image element portion and said complementary security image element portion occupy respective first and second percentages of each of said security image blocks to define respective characteristic relative occupation values for each security image block, and wherein
    said respective characteristic relative occupation values are substantially equivalent among a plurality of said security image blocks;

establishing a target characteristic relative occupation value;

establishing respective security image element portions and complementary security image element portions such that said respective security image element portions and said complementary security image element portions occupy said respective first and second percentages of a selected security image block;

determining a relative value of said first and second occupation percentages;

comparing said relative value of said first and second occupation percentages with said target characteristic relative occupation value;

adjusting at least one of said complementary security image element portion and said security image element portion where said comparison indicates a significant disparity between said first and second occupation percentages and said target characteristic relative occupation value, such that said relative value of said first and second occupation percentages substantially corresponds to said target characteristic relative occupation value; and generating a security document including said two-dimensional array of security image blocks, wherein each of said security image blocks is occupied by said security image elements and said complementary security image elements.

2. A method of preparing a security document as claimed in claim 1 wherein said step of adjusting at least one of said complementary security image element portion and said security image element portion comprises changing a stroke width of said security image element portion.

3. A method of preparing a security document as claimed in claim 1 wherein said step of adjusting at least one of said complementary security image element portion and said security image element portion comprises changing the dimensions of respective security image blocks.

4. A method of preparing a security document as claimed in claim 1 wherein said security image element portion comprises said security image elements and non-printed portions separating said security image elements.

5. A method of preparing a security document as claimed in claim 1 wherein said complementary security image element portion comprises said complementary security image elements and non-printed portions separating said complementary security image elements.

6. A method of preparing a security document as claimed in claim 1 wherein said security image elements are selected from a group consisting of circles, lines, squares, ovals, triangles, dots, and clusters thereof, in various combinations.

7. A method of preparing a security document as claimed in claim 1 wherein said security image area includes a camouflage image superimposed over said security image element portion and said complementary security image element portion, wherein said camouflage image comprises camouflage image elements selected from a group consisting of printed elements and non-printed elements.

8. A method of preparing a security document as claimed in claim 1 wherein the relative value of said first and second occupation percentages is determined through a mathematical comparison selected from a group consisting of a ratio, a product, a difference, a sum, and combinations thereof.

9. A method of preparing a security document as claimed in claim 1 wherein the relative value of said first and second occupation percentages is compared with said target characteristic relative occupation value through a mathematical comparison selected from a group consisting of a ratio, a product, a difference, a sum, and combinations thereof.

10. A method of preparing a security document as claimed in claim 2 wherein said indication of the number of pixels in said first pixel portion relative to the number of pixels in said second pixel portion is generated through a mathematical function selected from a group consisting of a ratio, a product, a difference, a sum, and combinations thereof.

11. A method of preparing a security document as claimed in claim 2 wherein said indication of the number of pixels in said first pixel portion relative to the number of pixels in said second pixel portion is generated by comparing a total pixel count to one of said number of pixels in said first pixel portion and said number of pixels in said second pixel portion.

12. A method of preparing a security document comprising the steps of:
   designating a security image area on the face of a document, wherein
      said security image area comprises a two-dimensional array of security image blocks,
      each of said security image blocks defines an image block pixel array and is occupied by a set of security image elements and a set of complementary security image elements,
      said security image elements occupy a security image element portion of each of said security image blocks,
      said complementary security image elements occupy a complementary security image element portion of each of said security image blocks,
      said security image elements and said complementary security image elements in respective security image blocks are arranged such that said complementary security image element portion and said security image element portion occupy respective first and second pixel portions of each of said security image blocks to define respective characteristic relative occupation values for each security image block, and wherein
      said respective characteristic relative occupation values are substantially equivalent among a plurality of security image blocks;
   establishing a target characteristic relative occupation value;
   establishing respective security image element portions and complementary security image element portions such that said respective security image element portions and said respective complementary security image element portions occupy said first and second pixel portions of a selected security image block pixel array;
   generating an indication of the number of pixels in said first pixel portion relative to the number of pixels in said second pixel portion;
   comparing said relative pixel number indication with said target characteristic relative occupation value;
   adjusting at least one of said complementary security image element portion and said security image element portion where said comparison indicates a significant disparity between said relative pixel number indication and said target characteristic relative occupation value, such that said relative pixel number indication substantially corresponds to said target characteristic relative occupation value; and
   generating a security document including said two-dimensional array of security image blocks, wherein each of said security image blocks is occupied by said security image elements and said complementary security image elements.

13. A security document comprising, a document face, security data printed on said document face, and a security image printed on said document face, wherein said security image is generated by:
   designating a security image area on said document face, wherein
      said security image area comprises a two-dimensional array of security image blocks,
      each of said security image blocks is occupied by a set of security image elements and a set of complementary security image elements,
      said security image elements occupy a security image element portion of each of said security image blocks,
      said complementary security image elements occupy a complementary security image element portion of each of said security image blocks,
      said security image elements and said complementary security image elements in respective security image blocks are arranged such that said security image element portion and said complementary security image element portion occupy respective first and second percentages of each of said security image blocks to define respective characteristic relative occupation values for each security image block, and wherein
      said respective characteristic relative occupation values are substantially equivalent among a plurality of said security image blocks;
   establishing a target characteristic relative occupation value;
   establishing respective security image element portions and respective complementary security image element portions such that said respective security image element portions and said respective complementary security image element portions occupy said first and second percentages of a selected security image block;
   determining a relative value of said first and second occupation percentages;
   comparing said relative value of said first and second occupation percentages with said target characteristic relative occupation value;

adjusting at least one of said complementary security image element portion and said security image element portion where said comparison indicates a significant disparity between said first and second occupation percentages and said target characteristic relative occupation value, such that said relative value of said first and second occupation percentages substantially corresponds to said target characteristic relative occupation value; and generating said security document including said two-dimensional array of security image blocks, wherein each of said security image blocks is occupied by said security image elements and said complementary security image elements.

14. A security document as claimed in claim 13 wherein said security image area includes a camouflage image superimposed over said security image element portion and said complementary security image element portion, wherein said camouflage image comprises camouflage image elements selected from a group consisting of printed elements and non-printed elements.

15. A method of preparing a security document comprising the steps of:

designating a security image area on the face of a document, wherein
  said security image area comprises a plurality of security image blocks,
  each of said security image blocks is occupied by a set of security image elements and a set of complementary security image elements,
  said security image elements occupy a security image element portion of each of said security image blocks,
  said complementary security image elements occupy a complementary security image element portion of each of said security image blocks,
  said security image elements and said complementary security image elements in respective security image blocks are arranged such that said security image element portion and said complementary security image element portion occupy respective first and second percentages of each of said security image blocks to define respective characteristic relative occupation values for each security image block,
  at least one of said plurality of security image blocks defines a first security image and at least one of said plurality of security image blocks defines a second security image such that said first security image is dimensionally distinct from said second security image, and wherein
  said respective characteristic relative occupation values of said first security image and said second security image are substantially equivalent;

establishing a target characteristic relative occupation value for said first security image and said second security image;

establishing respective security image element portions and respective complementary security image element portions within said first security image and said second security image such that said respective security image element portions and said respective complementary security image element portions occupy said first and second percentages of each of said first and second security image blocks;

determining a relative value of said first and second occupation percentages;

comparing said relative value of said first and second occupation percentages with said target characteristic relative occupation value;

adjusting at least one of said complementary security image element portion and said security image element portion where said comparison indicates a significant disparity between said first and second occupation percentages and said target characteristic relative occupation value, such that said relative value of said first and second occupation percentages substantially corresponds to said target characteristic relative occupation value; and generating a security document including said plurality of security image blocks, wherein each of said security image blocks is occupied by said security image elements and said complementary security image elements.

16. A security document processing system comprising a document issuing station and at least one document receiving station, wherein said document receiving station includes a security document reader arranged to read data printed on a security document, wherein:

said security document comprises a document face and a security image area defined on said document face;

said security image area comprises a plurality of security image blocks;

each of said security image blocks is occupied by a set of security image elements and a set of complementary security image elements;

said security image elements occupy a security image element portion of each of said security image blocks;

said complementary security image elements occupy a complementary security image element portion of each of said security image blocks;

said security image elements and said complementary security image elements in respective security image blocks are arranged such that said security image element portion and said complementary security image element portion occupy respective first and second percentages of each of said security image blocks to define respective characteristic relative occupation values for each security image block;

at least one of said plurality of security image blocks defines a first security image and at least one of said plurality of security image blocks defines a second security image such that said first security image is dimensionally distinct from said second security image;

said respective characteristic relative occupation values of said first security image and said second security image are substantially equivalent, wherein said security document reader is arranged to determine said respective characteristic relative occupation values; and wherein said security document is prepared by
  establishing a target characteristic relative occupation value,
  establishing respective security image element portions and complementary security image element portions such that said respective security image element portions and said complementary security image element portions occupy said respective first and second percentages of a selected security image block,
  determining a relative value of said first and second occupation percentages, comparing said relative value of said first and second occupation percentages with said target characteristic relative occupation value, adjusting at least one of said complementary security image element portion and said security image element portion where said comparison indicates a significant disparity between said first and second occupation percentages and said target characteristic relative occupation value, such that said relative value of said first and second occupation percentages substantially corresponds to said target characteristic relative occupation value, and generating a security document including said two-dimensional array of security image blocks, wherein each of said security image blocks is occupied by said security image elements and said complementary security image elements.

17. A method of processing a security document in a security document processing system comprising a document issuing station and at least one document receiving station including a security document reader arranged to read data printed on a security document, wherein said security document comprises a document face and a security image area defined on said document face, said security image area comprises a plurality of security image blocks, each of said security image blocks is occupied by a set of security image elements and a set of complementary security image elements, said security image elements occupy a security image element portion of each of said security image blocks, said complementary security image elements occupy a complementary security image element portion of each of said security image blocks, said security image elements and said complementary security image elements in respective security image blocks are arranged such that said security image element portion and said complementary security image element portion occupy respective first and second percentages of each of said security image blocks to define respective characteristic relative occupation values for each security image block, at least one of said plurality of security image blocks defines a first security image and at least one of said plurality of security image blocks defines a second security image such that said first security image is dimensionally distinct from said second security image, and said respective characteristic relative occupation values of said first security image and said second security image are substantially equivalent, and wherein said method of processing said security document comprises the steps of:

establishing a target characteristic relative occupation value;

establishing respective security image element portions and complementary security image element portions such that said respective security image element portions and said complementary security image element portions occupy said respective first and second percentages of a selected security image block;

determining a relative value of said first and second occupation percentages;

comparing said relative value of said first and second occupation percentages with said target characteristic relative occupation value;

adjusting at least one of said complementary security image element portion and said security image element portion where said comparison indicates a significant disparity between said first and second occupation percentages and said target characteristic relative occupation value, such that said relative value of said first and second occupation percentages substantially corresponds to said target characteristic relative occupation value;

generating said security document including said two-dimensional array of security image blocks, wherein each of said security image blocks is occupied by said security image elements and said complementary security image elements; and positioning said security document relative to said security document reader so as to determine said respective characteristic relative occupation values.

\* \* \* \* \*